United States Patent [19]

Meyer

[11] 4,451,010

[45] May 29, 1984

[54] REUSABLE ROD ASSEMBLY FOR MOUNTING BOXED ROLLS OF MATERIAL

[76] Inventor: Marcus F. Meyer, 954 "I" St., Washougal, Wash. 98671

[21] Appl. No.: 317,203

[22] Filed: Nov. 2, 1981

[51] Int. Cl.$^3$ .......................... B65F 3/02; B65H 35/06
[52] U.S. Cl. ..................................... 242/55.53; 225/47
[58] Field of Search ..................... 242/55, 55.53, 55.2, 242/68.4; 225/46, 47

[56] References Cited

U.S. PATENT DOCUMENTS

| | | | |
|---|---|---|---|
| 1,223,104 | 4/1917 | Pickett | 242/68.4 |
| 1,557,700 | 10/1925 | Jaderlund | 242/55.2 |
| 1,570,190 | 1/1926 | Williams | 242/55.2 |
| 1,671,724 | 5/1928 | Johancen et al. | 242/68.4 |
| 2,916,223 | 12/1959 | Klim | 242/55.2 |
| 2,983,461 | 5/1961 | Kray et al. | 242/68.4 |
| 3,667,597 | 6/1972 | Hollister | 242/55.53 X |
| 4,168,778 | 9/1979 | Buxton | 242/55.53 X |

Primary Examiner—Stuart S. Levy
Assistant Examiner—Scott J. Haugland
Attorney, Agent, or Firm—Romney, Golant, Martin, Disner & Ashen

[57] ABSTRACT

A rod assembly for mounting a roll of sheet material within its own box including a rod member with a cylindrical bearing and an enlarged diameter end-cap which collectively form a first component, and a second component collectively formed by a matching bearing and end-cap having an axial slot for removably receiving the rod member. After initial perforation of the panels at the end of the box by the rod member, the two components are insertable through and mounted in such end panels so that both bearings are journaled inside the open ends of the roll when the rod member is received in the axial slot. When the roll becomes empty, the two components can be manually pulled apart and reused by being compressed together into mounting engagement inside a full roll of material in another box.

7 Claims, 5 Drawing Figures

REUSABLE ROD ASSEMBLY FOR MOUNTING BOXED ROLLS OF MATERIAL

BACKGROUND OF THE INVENTION

This invention relates generally to dispensers for sheet materials on rolls, and more particularly to small rolls of paper, foil, and plastic sold in their own storage and/or dispenser boxes.

Rolls of home-use and workshop-use sheet materials are usually designed in standard size sections or in continuous sheets. In either event, most of the shipping and storage boxes are also designed for use as dispensers, whereby the desired length of material is pulled from the roll and then torn off, either along partially perforated boundary lines or alternatively by pulling the material against a toothed cutter located along one edge of the box. In both instances, some manual pressure must be exerted directly or indirectly on both the roll and the box, often resulting in the roll jamming against the box inhibiting or preventing further rotation, or in some instances the entire roll falls out of the box causing delay and sometimes damaging the roll of material as well as the box and its dispensing mechanism and cutter.

Most current boxes have no bearing mount whatsoever for the rolls, apparently since the earlier mounting devices which usually included a pair of crude bosses mounted on the interior ends of the box were unsatisfactory and unsuccessful. Since most dispensing boxes are flimsy cardboard, the aforementioned manual pressure applied to such earlier end-mounted rolls during the dispensing and tearing operations would often cause the box ends to spread apart thus releasing the roll from the bosses, or in some instances would even tear the box.

Accordingly, the normal everyday use of rolls of wax paper, aluminum foil, plastic wrap, plastic bags, and the like has become a frustrating and wasteful experience because of the inability of grown-ups and children alike to easily dispense and tear off the desired length of material without risk of jamming, separation of box and roll, damaging the box and/or its cutter, and damaging or dirtying the sheet material making it unusable for wrapping food and the like. Since these products have become highly price competitive, no manufacturer has seen fit to design a satisfactory improved roll mount for inclusion in each box. Moreover, a conventional rod mount permanently installed in a box and extending through a roll would probably be rather expensive compared to the cost of the box and roll of material, and would necessarily be thrown away with the box when the roll became empty.

In view of all the aforementioned problems, it is a primary object of the present invention to provide a rod assembly product which a consumer could easily install in a box of sheet material on a roll, and which can be removed when the roll becomes empty, and thereafter reinstalled in a new box having a full roll of material.

Another object of the invention is to provide a rod assembly which can be manually mounted in a dispenser box without the need of tools, and which eliminates jam-ups during unrolling as well as preventing the roll from becoming partially removed or entirely separated from the box during the dispensing and tearing of the material.

A further object is to provide an invention of the aforementioned characteristics which can be mounted on the boxes of different manufacturers despite variations in the specific dimensions of the roll and box, and independent of the dispensing mechanism and cutter device on the box.

A more specific object is to provide a rod member having a tapered tip on its forward end and which carries a cylindrical bearing and enlarged diameter end-cap on its rearward end to collectively form a first component, and to provide a matching cylindrical bearing and enlarged diameter end-cap forming a second component which includes an axial slot for removably receiving the free end of the rod member. A related object is to provide means for longitudinally adjusting the distance separating the end-caps.

Still another object of the invention is to provide a pair of cylindrical bearings which include inwardly tapered bevel means on their forward end for perforating the end panels of a dispenser box and for raising a roll of material in the box to suspended position without having to open the box or otherwise manipulate the position of the roll from its usual position resting on the box bottom.

Yet an additional object is to provide end-caps which are close-ended along their outer surface to provide safe mounting handles for the invention without unduly lengthening the box after the mounting has been completed.

A more specific object is to provide both end caps of substantially the same size and configuration, with a first end cap either formed integral with the rod member or alternatively having an internally threaded axial slot for rotatable engagement with matching threads on the rearward end of the rod member, and with a second end cap having an internally roughened axial slot for frictional push-pull engagement with the forward end of the rod member. A related object is to provide an internal diameter for the threaded axial slot of the first end cap which is less than the outer diameter of the forward end of the rod member to prevent the first end cap from being carried on the wrong end of the rod member.

Another object is to provide a rod assembly which holds the roll of material in suspended position independently of the position the box is in during the dispensing operation, and which remains fixedly mounted on the box during repeated agitation and repositioning which occurs during the period of days, weeks, and even months in which the sheet material is dispensed a portion at a time from the roll inside the box.

Other objects and advantages of the invention will be apparent to those skilled in the art, in view of the description of exemplary embodiments of the invention as set forth in the accompanying drawings and detailed specification recited hereinafter.

DETAILED DESCRIPTION OF THE EXEMPLARY EMBODIMENT

Figure 1:
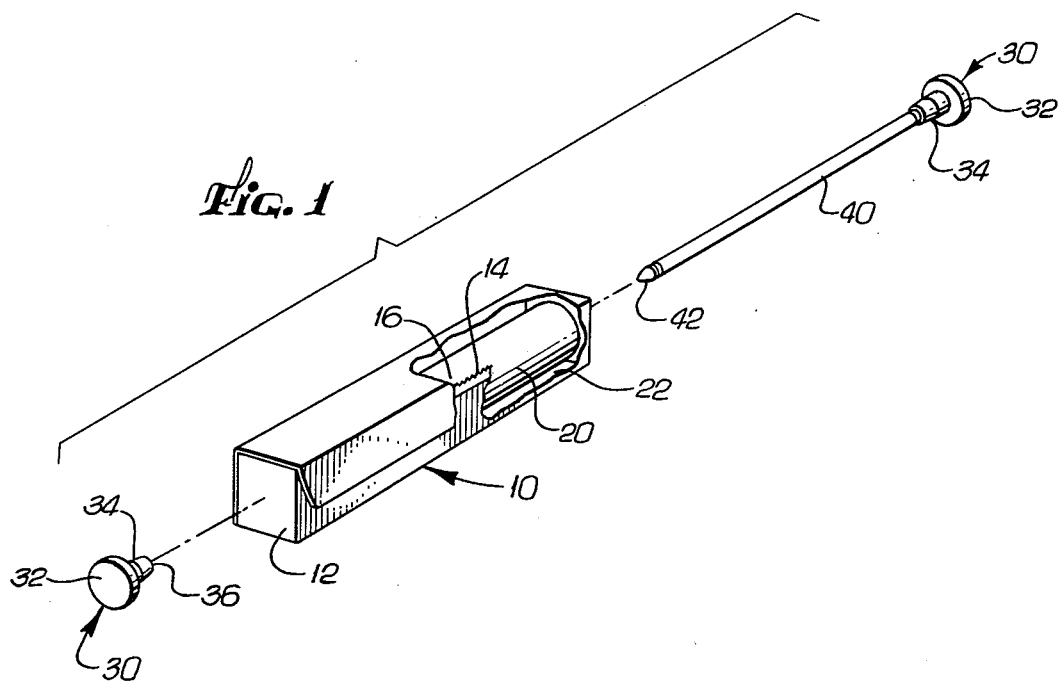
FIG. 1 is an exploded view showing a presently preferred embodiment of the invention prior to mounting in a box having a roll of material resting on the bottom of the box.

General speaking, the invention is designed for use with a type of rectangular box 10 with end walls 12, and having an elongated cutter edge 14 adjacent an exit 16. A hollow roll 18 of sheeted material 20 typically rests on the box bottom 22, and rotates inside the box when one hand grips the box and the other hand pulls the material out of the box through the exit hole.

Figure 2:
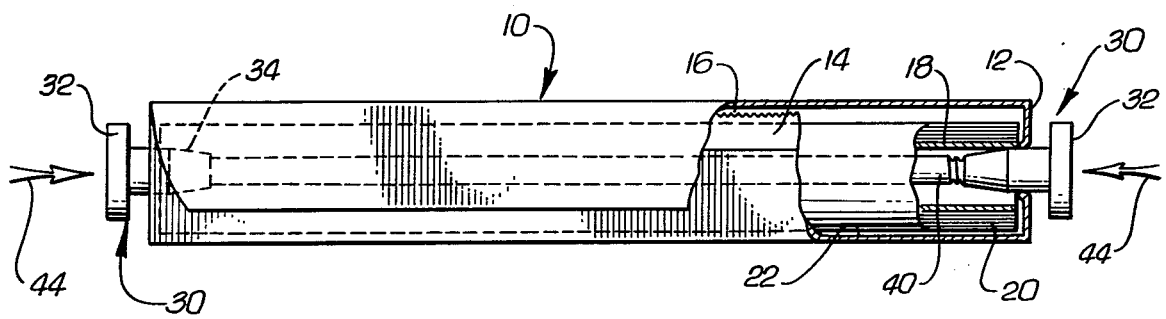
FIG. 2 shows the embodiment of FIG. 1 after it has been fully assembled to journal the roll of material in a suspended position for use with a box stored in a drawer or on a counter top.
Figure 3:
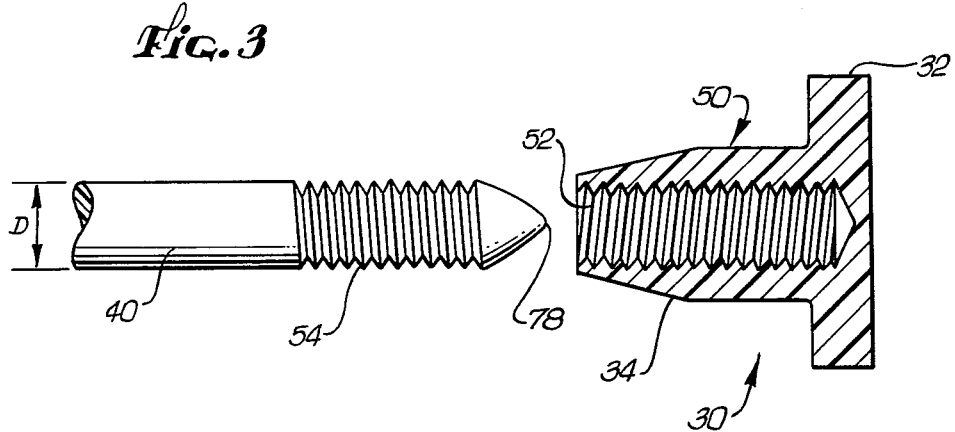
FIG. 3 shows a presently preferred threaded construction for attaching an end cap to the rearward end of a rod member.

In order to provide a removable rod assembly for facilitating the aforementioned dispensing of sheeted material from the roll without having to remove the roll from the box, the invention generally includes a pair of bearing members 30 having large diameter end-caps 32 and forwardly tapered heads 34. One of the bearing members includes an axial slot 36 which is designed for removable coupling with the other of the bearing members which carries a small diameter rod 40 having a free end 42. The two bearing components are inserted in opposite ends of the box and then are manually clamped toward each other as shown by the directional arrows 44 in FIG. 2, thereby fixedly but removably attaching the bearing members to the box while at the same time journaling the roll in a suspended position off the bottom of the box and preventing jamming or other interference during the dispensing operation.

While the invention contemplates various types of attachment means for removably and adjustably connecting the rod to one or more of the bearing members, the preferred embodiment of the drawing shows a first bearing member 50 having a threaded axial slot 52 for frictionally receiving a threaded rod end 54 which provides both a secure connection as well as a longitudinally adjustable one by rotating the bearing member relative to the rod. Where desirable, the first bearing member can also be integrally formed on one end of the rod to provide a unitary component to be used in combination with the second bearing member. An axial slot 56 is also provided in a second bearing member 58 for receiving the free end 42 of the rod in a frictional push-pull connection. To facilitate the desirable frictional engagement without creating a sealed air pocket in the end of the axial slot, inside wall 62 is preferably roughened, and an addition a circumferential slot 64 may be provided around the outer surface of the rod. Thus, in the illustrated embodiment, the two bearing members can be clamped together on opposite ends of the rod by manual compression applied longitudinally and/or rotationally against the outer disc-like surfaces 66 enclosing and covering the axial slots. The extended length of the axial slots inside the bearing members enable the end caps to lie closely adjacent to the box ends to minimize the additional length added to the box.

Figure 5:
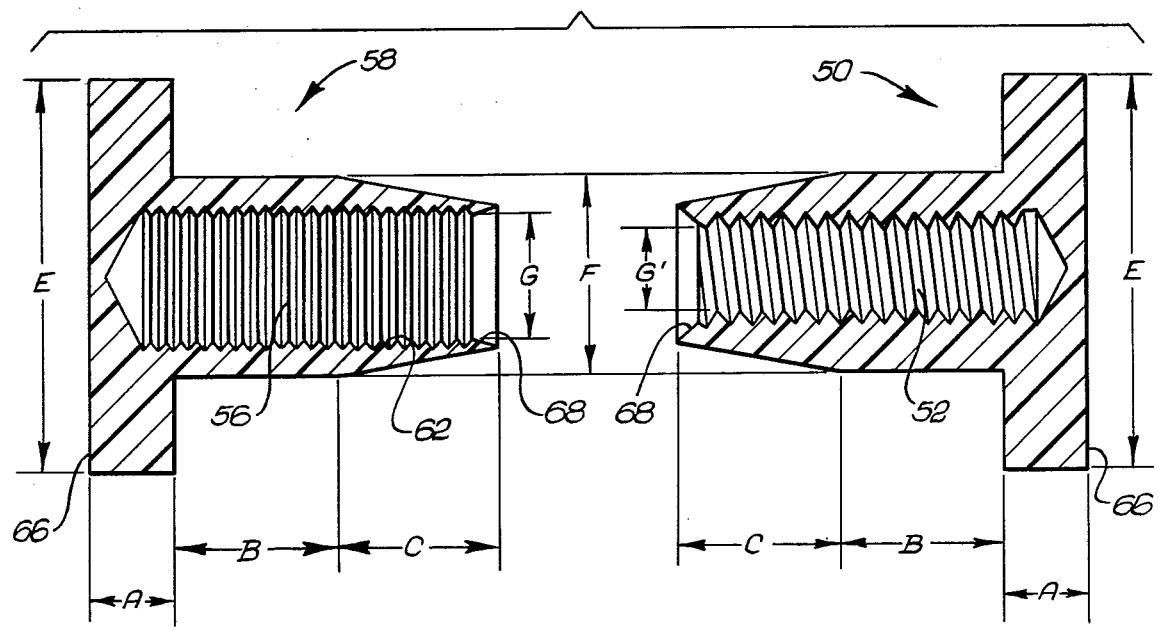
FIG. 5 is an enlarged sectional view showing the size and proportions of the virtually identical end caps of the presently preferred embodiment of FIG. 1.

Except for the different design of the axial slots 52, 56, the bearing members are virtually identical, as best shown in FIG. 5. In that regard, the end caps of the prototype device were made of high density plastic with a cap thickness A of ¼ inch, a flat bearing surface B of ½ inch, and a beveled bearing surface C of ½ inch as measured in the axial direction. The radial dimensions of the prototype were a cap diameter E of 1¼ inches, and bearing diameter F of ½" inch, thereby providing a wall thickmess of approximately ¼ inch surrounding the axial slots. The axial slot 56 has an inside diameter G sized to receive a rod end having approximate diameter D of ⅜ inch. An oblique shoulder 68 helps to thicken the slot edge and provide a guide surface for receiving the rod ends. The axial slot 52 has a slightly smaller inside diameter G' to provide the necessary thread ridges, thereby making it impossible to fit the free end of the rod inadvertently into the wrong axial slot 52.

Figure 4:
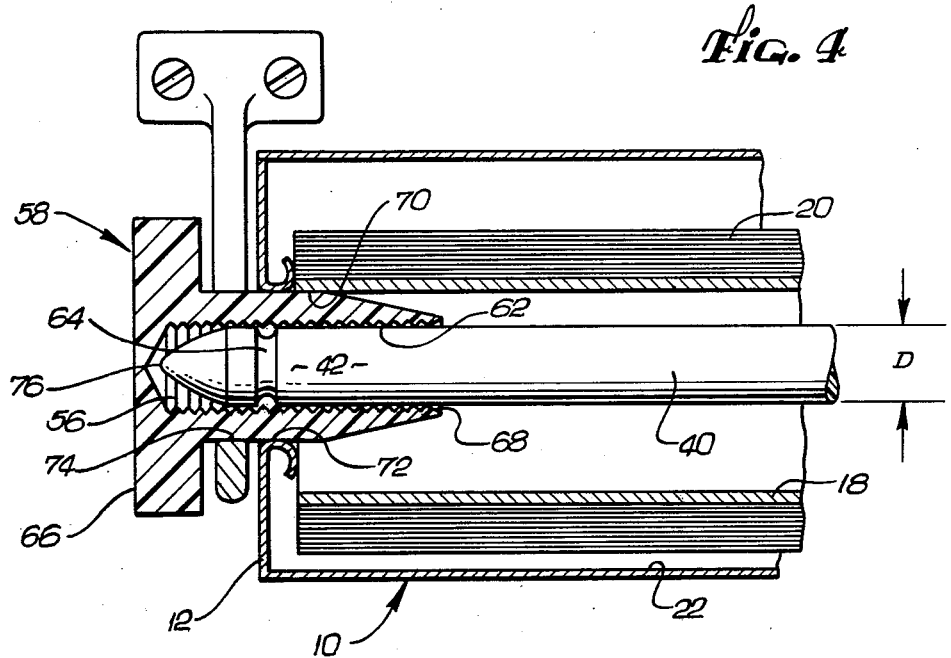
FIG. 4 is an enlarged fragmentary view of the embodiment of FIG. 1 showing a presently preferred friction fit construction for attaching an end cap to the forward end of a rod member, for use with a box stored on a wall bracket.

The slope of the bevel C is preferably gradual to make it easier to enlarge the perforations of the box ends during the assembly process, as well as to lift the hollow roll off the box bottom without any resistive hang-up. The extended length of the flat outer bearing surface B enables it to be used as a roll support as at 70, a box engagement surface or stop means as at 72, as well as an optional wall rack handle area as at 74 (See FIG. 4). The rod end tips 76, 78 are sufficiently tapered to provide initial perforations of the box ends during assembly without being formed into dangerous points. However, in the preferred assembly process, the rod end 78 is preliminarily mounted by threading onto its corresponding bearing member, so that end 76 is used to initially perforate both box ends.

In addition to the unique structural components previously described, the invention also includes a quick method of removably mounted the two bevel-headed bearings in opposite ends of the box without having to remove the hollow roll of material during the assembly process. The user first grasps the box in one hand while placing the free end of the rod adjacent one box end, and then forces the the rod through the box end and pushes it sufficiently forward until the beveled head of the attached bearing member reaches the initial perforation to enlarge the hole further. The entire component is removed and the step repeated at the central portion of the opposite box end, this time leaving the rod inside the box and extending through the hollow roll. Where possible, the rod is sufficiently long to extend out through the first perforation. The second bearing member is then axially aligned with the free end of the rod, and the assembly is completed by manually compressing the two bearings toward each other into frictional engagement, with the beveled heads enlarging the holes in the box ends and also lifting the hollow roll into a secure but loose position suspended from the bottom of the box. Although the edges of the box end apertures may in some instances ride on the bevel portion of the bearings, it is preferable to be able to push both bearing members sufficiently through the holes so that the flat bearing surfaces B ride against the box wall, thus providing an additional restraint holding the rod assembly in assembled position.

It will be appreciated to those skilled in the art that further changes and revisions can be made to the illustrated embodiment described and shown herein without departing from the spirit of the invention, and that the invention contemplates such equivalent devices and methods, all as set forth and covered by the following claims.

I claim as my invention:

1. A portable rod assembly for providing supplemental mounting of a roll of sheet material which is already housed in a storage box, in order to facilitate dispensing the sheet material without the need of or the risk of the roll being removed from the box, comprising:

small diameter rod means for inserting through the roll of sheet material including tapered tip means on at least one end for initially perforating opposite panels at the ends of the box containing the roll of material;

a pair of bearing members each having central bearing means of substantially constant diameter which is more than the diameter of said rod means and less than the diameter of the roll of material and further including tapered bevel means on the forward end which are manually insertable through opposite panels at the end of the box, respectively, into the roll for making enlarged perforations to receive said bearing members, with adjacent portions of said central bearing means capable of loosely journaling the roll of material during its rotation to retain the roll inside the box while also holding the roll in a suspended position off the bottom of the box and snugly engaging the edges of the box perforations formed by said tapered bevel means;

cap members having a diameter greater than the diameter of said central bearing means and carried on the outer ends of said bearing members, respectively;

said rod means extending between said pair of bearing members for holding said bearing members together in mounted position in the aforesaid box panels with said cap members a predetermined distance apart outside the aforesaid box panels; and attachment means removably connecting at least one of said bearing members to said rod means for coupling the rod assembly together into an integral unit with the box during use and to enable the rod assembly to be disengaged after use from a box having an empty roll of material and reinserted into another box having a full roll of material.

2. The device of claim 1 wherein said rod means includes a free end and a non-free end, and carries one of said bearing members and one of said cap members on its non-free end to collectively from one assembly component; and wherein the other ones of said bearing and cap members carry said attachment means to collectively form a second assembly component; and wherein said attachment means receives said free end of said rod means to hold said bearing members together in mounted position passing through the box to inside the roll.

3. The device of claim 1 wherein said rod means includes longitudinal adjustment means for varying the predetermined distance between said cap members to accomodate differently sized boxes and/or to accomodate wall-mounted brackets for holding the boxed rolls.

4. The device of claim 1 wherein both of said cap members are close-ended on their outer surface to prevent said rod means from extending outwardly beyond said cap members.

5. A method of removably mounting a pair of bevelheaded bearing components through opposite ends of a box to journal a hollow roll of material in suspended position inside the box without having to remove the hollow roll of material from the box, including the steps of:

manually grasping a box in one hand and placing a free end of a rod carrying a first bearing so that the free end is adjacent to the box;

perforating the central portion of both ends of the box at points aligned with the open ends of the hollow roll of material, including a first perforating step of inserting the rod and at least partially pushing the beveled head of the first bearing through a first box end, followed by the step of withdrawing the first bearing and its attached rod from the first box end and leaving an aperture in the first box end at least partially communicating with the interior of the hollow roll, and a second perforating step of inserting the rod and at least partially pushing the beveled head of the first bearing through a second box end to bring the rod into the hollow roll;

aligning longitudinally the bearing components including inserting and at least partially pushing the beveled head of the second bearing through the aperture in the first box end into the hollow roll; and manually compressing the two bearing components toward each other to frictionally engage the free end of the rod with the second bearing and to bring a non-beveled bearing surface of both bearing components into snug engagement in the apertures formed by said perforating steps and to engage the beveled heads of both bearings into opposite ends of the hollow roll of material to raise the roll from the bottom of the box while at the same time securely holding the roll inside the box before, during and after material is dispensed from the roll.

6. The method of claim 5 wherein said aligning step includes protruding the free end of the rod out through the aperture in the fist box end to facilitate its engagement by the second bearing during said manually compressing step.

7. The method of claim 5 wherein said manually compressing step includes pushing the beveled heads of both bearing components sufficiently into opposite ends of the hollow roll to bring a portion of the non-beveled bearing surface of both bearing components into loose supporting relationship with the inside of the hollow roll.

* * * * *